United States Patent
Nagaoka et al.

(10) Patent No.: US 10,565,438 B2
(45) Date of Patent: Feb. 18, 2020

(54) VEHICLE PERIPHERY MONITOR DEVICE

(71) Applicant: HONDA MOTOR CO., LTD., Tokyo (JP)

(72) Inventors: Nobuharu Nagaoka, Nasukarasuyama (JP); Makoto Aimura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1249 days.

(21) Appl. No.: 14/378,222

(22) PCT Filed: Jan. 10, 2013

(86) PCT No.: PCT/JP2013/050312
§ 371 (c)(1),
(2) Date: Aug. 12, 2014

(87) PCT Pub. No.: WO2013/136827
PCT Pub. Date: Sep. 19, 2013

(65) Prior Publication Data
US 2015/0035962 A1 Feb. 5, 2015

(30) Foreign Application Priority Data
Mar. 12, 2012 (JP) ................................. 2012-053960

(51) Int. Cl.
*G06K 9/00* (2006.01)
*B60R 1/00* (2006.01)
(Continued)

(52) U.S. Cl.
CPC ............ *G06K 9/00362* (2013.01); *B60R 1/00* (2013.01); *G06K 9/00791* (2013.01);
(Continued)

(58) Field of Classification Search
CPC ... B60R 16/037; B60R 16/0373; B60R 25/00; B60R 25/1004; B60R 25/01; B60R 7/04;
(Continued)

(56) References Cited

U.S. PATENT DOCUMENTS 5,369,590 A * 11/1994 Karasudani ............. G01S 11/12
180/167
7,643,911 B2 * 1/2010 Ishihara .................... B60R 1/00
701/1
(Continued)

FOREIGN PATENT DOCUMENTS

EP 2050042 A2 4/2009
JP 2003-284057 A 10/2003
(Continued)

OTHER PUBLICATIONS

International Search Report dated Mar. 5, 2013, issued in corresponding application No. PCT/JP2013/050312.
(Continued)

*Primary Examiner* — Dave Czekaj
*Assistant Examiner* — Kehinde Abimbola
(74) *Attorney, Agent, or Firm* — Westerman, Hattori, Daniels & Adrian, LLP

(57) ABSTRACT

Provided is a vehicle periphery monitor device for accurately distinguishing between and detecting two side-by-side pedestrians and a vehicle that is lighting lights. With regard to a pedestrian candidate having at least two head candidates, a reference image creation unit creates the peripheral image of one of the head candidates as a reference image and creates an inverted image in which the right and left sides of the reference image are inverted. An object determination unit sets the peripheral image of the other heat candidate as a comparative image, and determines whether the head candidates are the pedestrians or the vehicle on the basis of
(Continued)

the consistency of the reference image and the inverted image relative to the comparative image.

6 Claims, 9 Drawing Sheets

(51) Int. Cl.
    *G06K 9/62*     (2006.01)
    *H04N 5/33*     (2006.01)

(52) U.S. Cl.
    CPC ............. *G06K 9/6201* (2013.01); *H04N 5/33* (2013.01); *B60R 2300/307* (2013.01); *B60R 2300/8033* (2013.01); *G06K 2209/21* (2013.01)

(58) Field of Classification Search
CPC ........ B60R 2300/302; B60R 2300/303; B60R 1/00; B60R 2001/1253; B60R 1/12; B60R 2001/1215; B60R 2001/1223; B60R 2300/205; B60R 2300/105; B60R 2300/106; B60R 2300/30; B60R 2300/301; B60R 2300/70; B60R 11/04; B60R 16/0232; B60R 2300/8006; B60R 2300/8073; B60R 2011/004; B60R 2011/008; B60R 2300/307; B60R 2300/8093; B60R 16/03; B60R 1/02; B60W 40/09; G06K 9/00805; G06K 9/00791; G01S 13/723; G01S 13/87; G01S 13/931; G01S 2013/9321; G01S 2013/9325; G01S 2013/9342; G01S 2013/9346; G01S 2013/935; G01S 2013/9353; G01S 2013/9357; G09G 3/3688; G09G 3/3614; G09G 3/3648; G09G 2310/0248; G09G 2310/027; G09G 2310/0297; G09G 2310/06; G09G 2330/021; G09G 2320/0209
See application file for complete search history.

(56) References Cited

U.S. PATENT DOCUMENTS

| | | | | |
|---|---|---|---|---|
| 7,671,725 B2* | 3/2010 | Tsuji | ................... | G06K 9/00369 340/435 |
| 7,898,434 B2* | 3/2011 | Taniguchi | ................ | B60R 1/00 340/937 |
| 8,005,266 B2* | 8/2011 | Saka | ................... | G06K 9/00805 348/118 |
| 8,126,210 B2* | 2/2012 | Fardi | .......................... | G06T 7/70 348/148 |
| 8,174,578 B2* | 5/2012 | Aimura | ..................... | B60R 1/00 348/135 |
| 8,411,145 B2* | 4/2013 | Fardi | .......................... | B60R 1/00 348/148 |
| 8,536,995 B2* | 9/2013 | Nogami | ................... | G06T 7/215 340/441 |
| 8,648,912 B2* | 2/2014 | Matsuda | ................... | B60R 1/00 348/143 |
| 8,983,123 B2* | 3/2015 | Matsuda | ............... | G06T 7/0046 382/103 |
| 9,067,537 B2* | 6/2015 | Aimura | ..................... | B60R 1/00 |
| 2005/0240342 A1* | 10/2005 | Ishihara | ................... | B60R 1/00 701/1 |
| 2007/0222566 A1* | 9/2007 | Tsuji | .................. | G06K 9/00369 340/435 |
| 2007/0248245 A1* | 10/2007 | Aimura | .............. | G06K 9/00362 382/104 |
| 2007/0269079 A1* | 11/2007 | Taniguchi | .......... | G06K 9/00369 382/104 |
| 2007/0291987 A1* | 12/2007 | Saka | ................... | G06K 9/00369 382/103 |
| 2008/0007618 A1* | 1/2008 | Yuasa | ....................... | B60R 1/00 348/118 |
| 2008/0130954 A1* | 6/2008 | Taniguchi | .......... | G06K 9/00805 382/104 |
| 2009/0009314 A1* | 1/2009 | Taniguchi | ................ | B60R 1/00 340/461 |
| 2010/0103262 A1* | 4/2010 | Fardi | ......................... | B60R 1/00 348/148 |
| 2010/0104138 A1* | 4/2010 | Fardi | ....................... | H04N 7/181 382/106 |
| 2010/0278392 A1 | 11/2010 | Nagaoka et al. | | |
| 2011/0170748 A1* | 7/2011 | Aimura | ................... | G01C 3/085 382/106 |
| 2011/0234804 A1* | 9/2011 | Matsuda | ................... | B60R 1/00 348/148 |
| 2011/0234805 A1* | 9/2011 | Matsuda | ................... | B60R 1/00 348/148 |
| 2012/0044352 A1* | 2/2012 | Aimura | ..................... | B60R 1/00 348/148 |
| 2012/0062743 A1* | 3/2012 | Lynam | ................... | B60Q 9/005 348/148 |
| 2012/0235805 A1* | 9/2012 | Nogami | ................... | G06T 7/215 340/441 |
| 2012/0281878 A1* | 11/2012 | Matsuda | ............... | G06T 7/0046 382/103 |
| 2012/0300076 A1* | 11/2012 | Aimura | ..................... | B60R 1/00 348/148 |
| 2012/0320212 A1* | 12/2012 | Aimura | ..................... | B60R 1/00 348/148 |
| 2013/0103299 A1* | 4/2013 | Matsuda | ................. | G06F 17/00 701/300 |
| 2016/0042238 A1* | 2/2016 | Lynam | ................... | B60Q 9/005 701/45 |

FOREIGN PATENT DOCUMENTS

| | | | | |
|---|---|---|---|---|
| JP | 2004-348645 A | 12/2004 | | |
| JP | 2009-037476 A | 2/2009 | | |
| JP | 4521642 B2 | 8/2010 | | |
| JP | WO2011065149 | * | 4/2013 | ............. G08G 1/16 |
| WO | 2008056261 A2 | 5/2008 | | |

OTHER PUBLICATIONS

European Search Report dated Dec. 10, 2015 issued in counterpart European patent application No. 13761376.6. (7 pages).

* cited by examiner

VEHICLE PERIPHERY MONITOR DEVICE

TECHNICAL FIELD

The present invention relates to a vehicle periphery monitoring apparatus (monitor device) for monitoring the periphery of a vehicle using an image that is captured by an infrared camera mounted on the vehicle. More particularly, the present invention relates to a vehicle periphery monitoring apparatus, which is suitable for use on a vehicle especially when the vehicle is travelling at night or in dark places.

BACKGROUND ART

As disclosed in Japanese Laid-Open Patent Publication No. 2003-284057 (hereinafter referred to as "JP2003-284057A"), it has heretofore been customary for a vehicle periphery monitoring apparatus to detect an object such as a pedestrian or the like that has a possibility of colliding with a vehicle, from images (a grayscale image and a binary image converted therefrom) of the periphery of the vehicle, which are captured by infrared cameras, and to provide information concerning the detected object to the driver of the vehicle.

More specifically, the vehicle periphery monitoring apparatus disclosed in JP2003-284057A detects, as an object, a high-temperature area in images of the periphery of the vehicle, which are captured by a set of left and right infrared cameras (stereo cameras), and calculates the distance up to the object by determining a parallax between the object in the left and right images. The vehicle periphery monitoring apparatus detects an object such as a pedestrian or the like that is likely to affect travelling of the vehicle, i.e., that has a possibility of colliding with the vehicle, based on the position of the object and the direction in which the object moves, and issues a warning concerning the detected object (see paragraphs [0014] and [0018] of JP2003-284057A).

However, since such a vehicle periphery monitoring apparatus including a pair of left and right infrared cameras is expensive, this type of vehicle periphery monitoring apparatus has been incorporated in limited luxury vehicles only.

In an attempt to reduce the cost of vehicle periphery monitoring apparatus, a vehicle periphery monitoring apparatus, as disclosed in Japanese Patent No. 4521642 (hereinafter referred to as "JP4521642B") employs a single vehicle-mounted infrared camera, which captures at least two images (two frames) of an object in the vicinity of a vehicle within a given time interval. As the relative speed between the object and the vehicle that incorporates the vehicle periphery monitoring apparatus therein is higher, the size of an image of the object in a later-captured image changes more greatly than the size of an image of the object in an earlier-captured image. Since the relative speed between the object and the vehicle is higher, the object, which is present in front of the vehicle, reaches the vehicle in a shorter period of time. Consequently, even a single infrared camera is able to monitor the periphery of a vehicle by estimating a period of time that an object takes to reach the vehicle, i.e., a so-called TTC (Time To Contact or Time to Collision), from the rate of change of the size of images of an object, which are captured within a given time interval (see paragraphs [0019] and [0020] of JP4521642B).

SUMMARY OF INVENTION

According to JP4521642B, the vehicle periphery monitoring apparatus judges whether an object that is imaged at different times is a person or a vehicle, by dividing the object into local areas depending on the type of object, i.e., a person or a vehicle. The images of the object that are captured at different times are made equal in size to each other, and then, the vehicle periphery monitoring apparatus decides if the object is a person or a vehicle based on whether the degree of correlation between the local areas is equal to or greater than a threshold value.

When a vehicle, which incorporates the conventional vehicle periphery monitoring apparatus disclosed in JP2003-284057A or JP4521642B therein, is driving at night, the vehicle periphery monitoring apparatus is capable of displaying a video image of a pedestrian walking ahead of the vehicle, which has been detected by an infrared camera as a target object to be monitored, even though the pedestrian cannot be seen clearly by the eyes of the driver of the vehicle.

When the vehicle periphery monitoring apparatus of the related art detects a person, i.e., a pedestrian, at night or in dark areas, the vehicle periphery monitoring apparatus can easily identify the shape of a person's head from the image that is captured by the infrared camera, because the head is exposed and has a high surface temperature, and further because the head has a round shape.

When the infrared camera of the vehicle periphery monitoring apparatus captures the front end of another vehicle, e.g., an oncoming vehicle, at night, the vehicle periphery monitoring apparatus can easily identify the headlights, which are positioned at respective ends in the transverse direction of the other vehicle. When the infrared camera of the vehicle periphery monitoring apparatus captures the rear end of another vehicle, e.g., a preceding vehicle travelling ahead of the vehicle in the same direction, at night, the vehicle periphery monitoring apparatus can easily identify the taillights, which are positioned at respective ends in the transverse direction of the other vehicle.

However, when pedestrians are positioned side by side, it is difficult for the vehicle periphery monitoring apparatus to distinguish between the heads of the pedestrians and the headlights (a set of left and right headlights) or the taillights (a set of left and right taillights) of another vehicle in an image that is captured by the infrared camera.

The present invention has been made in view of the aforementioned problems. An object of the present invention is to provide a vehicle periphery monitoring apparatus, which is capable of accurately distinguishing between at least two pedestrians positioned side by side and a vehicle with energized lights thereon.

According to the present invention, there is provided a vehicle periphery monitoring apparatus for monitoring pedestrians in periphery of a vehicle based on an image captured by an infrared camera mounted on the vehicle, comprising a head candidate extractor for extracting at least two head candidates, which are spaced substantially horizontally, from the image, a reference image generator for generating a peripheral image including one of the extracted at least two head candidates as a reference image, and a target object determiner, which uses a peripheral image including another head candidate as a comparison image, for judging whether the at least two head candidates represent pedestrians or a vehicle based on a degree of symmetry between the comparison image and the reference image.

According to the present invention, if the degree of symmetry is high between the comparison image, as a peripheral image including the other head candidate, and the reference image, as a peripheral image including the one head candidate, then the head candidates are judged as representing pedestrians, and if the degree of symmetry is low, then the head candidates are judged as representing a vehicle. Thus, pedestrians and vehicles can be distinguished accurately from each other.

The reasons for the above judgment are as follows. The head of a pedestrian is generally of a round, horizontally symmetrical shape. Therefore, peripheral images (the reference image and the comparison image) including actual heads of pedestrians therein are highly symmetrical in shape. On the other hand, lights on a vehicle, which tend to be recognized in error as the heads of pedestrians by an infrared camera, are frequently of horizontally asymmetrical shapes, and therefore, peripheral images (the reference image and the comparison image), which include actual lights therein, are considered as representing a vehicle. Further, when considered in this manner, the lights on the vehicle are often captured as asymmetrical images due to the presence of other members such as a fender, pillars, etc., near the lights.

The reference image generator may generate an image of only the one head candidate as the peripheral image including the one head candidate for use as the reference image, and the target object determiner may use an image of only the other head candidate as the peripheral image including the other head candidate for use as the comparison image, and judge whether the at least two head candidates represent pedestrians or a vehicle based on the degree of symmetry between the image of only the other head candidate and the image of only the one head candidate.

The image of only a head candidate, which actually represents a head, implies an image of the head itself, or an image of a quadrangle circumscribing the head (because the area of the head is represented by "1", whereas the area other than the head is represented by "0", the image of the circumscribing quadrangle eventually represents only the head). The image of only a head candidate, which actually represents a light, implies an image of the light itself, or an image of a quadrangle circumscribing the light (because an area of the light is represented by "1", whereas the area other than the light is represented by "0", the image of the circumscribing quadrangle eventually represents only the light).

As described above, inasmuch as the head is of a round, nearly horizontally symmetrical shape, and certain lights are of a quadrangular, horizontally asymmetrical shape, by comparing such shapes, the head candidates can accurately be distinguished as pedestrians or a vehicle.

The reference image generator may generate the peripheral image including the one of the extracted at least two head candidates as the reference image, and generate an inverted image, which is a horizontal inversion of the reference image, and the target object determiner may use the peripheral image including the other head candidate as the comparison image, and judge whether the at least two head candidates represent pedestrians or a vehicle based on a degree of coincidence between the reference image and the comparison image, and a degree of coincidence between the inverted image and the comparison image.

According to the present invention, if the degree of coincidence between the comparison image of the other head candidate and the reference image of the one head candidate, and the degree of coincidence between the comparison image of the other head candidate and the inverted image of the one head candidate are high, then the head candidates are judged as representing pedestrians. If the aforementioned degrees of coincidence are low, then the head candidates are judged as representing a vehicle. Therefore, the pedestrians and the vehicle can accurately be distinguished from each other.

The reasons for the above judgment are as follows. As described above, the head of a pedestrian is generally of a symmetrical shape with respect to a vertical line that divides the head into left and right parts. On the other hand, a light on a vehicle, which tends to be recognized in error as the head of a pedestrian by an infrared camera, is frequently of an asymmetrical shape with respect to a vertical line that divides the light into two parts.

The reference image generator may generate the reference image in such a manner that another feature is included in the peripheral image in addition to the head candidates. The reference image, which is generated in this manner, is effective to enable pedestrians and vehicles to be distinguished accurately from each other.

The other feature may comprise a substantially vertical edge, which is offset from the head candidates to the left or right of the head candidates. The edge, which is used as the other feature, allows pedestrians and vehicles to be distinguished more accurately from each other.

The target object determiner may judge whether the at least two head candidates represent pedestrians or lights mounted in left and right positions on the vehicle.

According to the present invention, at least two pedestrians positioned side by side and a vehicle with energized lights thereon can be accurately distinguished from each other. As a result, vehicles are less frequently detected in error as pedestrians.

DESCRIPTION OF EMBODIMENTS

Embodiments of the present invention will be described below with reference to the drawings.

Figure 1:
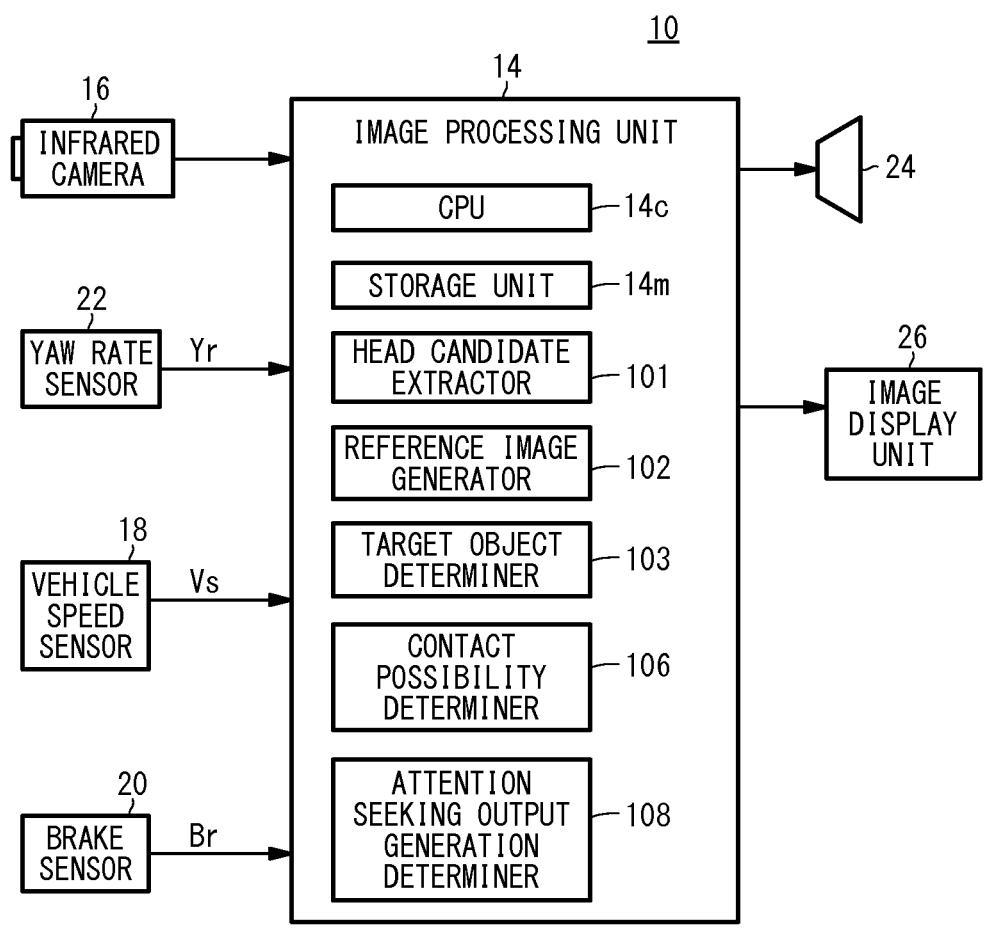
FIG. 1 is a block diagram of a vehicle periphery monitoring apparatus according to an embodiment of the present invention.
Figure 2:
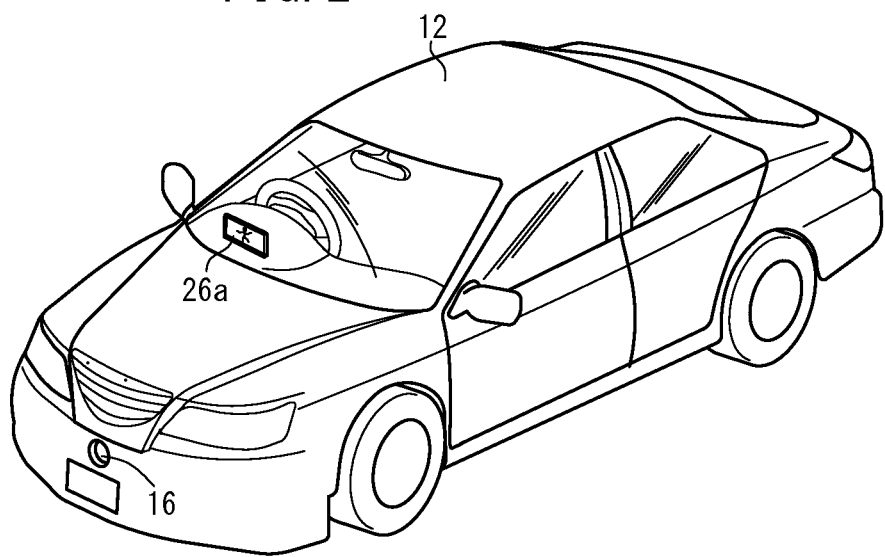
FIG. 2 is a perspective view of a vehicle in which the vehicle periphery monitoring apparatus shown in FIG. 1 is incorporated.

FIG. 1 shows in block form a vehicle periphery monitoring apparatus 10 according to an embodiment of the present invention. FIG. 2 shows in perspective a vehicle (hereinafter also referred to as a "driver's own vehicle") 12 in which the vehicle periphery monitoring apparatus 10 shown in FIG. 1 is incorporated.

As shown in FIGS. 1 and 2, the vehicle periphery monitoring apparatus 10 includes an image processing unit 14 for controlling the vehicle periphery monitoring apparatus 10, a single (monocular) infrared camera 16 (image capturing device) connected to the image processing unit 14, a vehicle speed sensor 18 for detecting a vehicle speed Vs of the vehicle 12, a brake sensor 20 for detecting a depressed angle (brake depressed angle) Br of a brake pedal that is operated by the driver of the vehicle 12, a yaw rate sensor 22 for detecting a yaw rate Yr of the vehicle 12, a speaker 24 for outputting a warning sound or the like, and an image display unit 26 comprising a HUD (Head Up Display) 26a or the like for displaying an image that is captured by the infrared camera 16, so as to enable the driver of the vehicle 12 to recognize an object (moving object, target object to be monitored) such as a pedestrian or the like that runs a high risk of coming into contact with the vehicle 12.

The image display unit 26 is not limited to the HUD 26a, but may be a display unit for displaying a map, etc., of a navigation system that is incorporated in the vehicle 12, or a display unit (multi-information display unit) disposed in a meter unit for displaying mileage information, etc.

The image processing unit 14 detects a target object to be monitored, such as a pedestrian or the like in front of the vehicle 12, based on an infrared image of the periphery of the vehicle 12 and signals indicative of a traveling state of the vehicle 12, i.e., signals representing the vehicle speed Vs, the brake depressed angle Br, and the yaw rate Yr. If the image processing unit 14 decides that it is highly likely for the vehicle 12 to collide with the target object to be monitored, then the image processing unit 14 outputs a warning sound, e.g., a succession of blips from the speaker 24, and highlights the target object to be monitored in a captured image, which is displayed as a grayscale image on the HUD 26a along with a surrounding color frame in a bright color such as yellow or red, thereby seeking the attention of the driver.

The image processing unit 14 includes an input/output circuit comprising an A/D converting circuit for converting analog signals input thereto into digital signals, an image memory (storage unit 14m) for storing digital image signals, a CPU (Central Processing Unit) 14c that performs various processing operations, a storage unit 14m including a RAM (Random Access Memory) for storing data processed by the CPU 14c and a ROM (Read Only Memory) for storing a program executed by the CPU 14c, tables, maps, and templates, e.g., pedestrian (human body) templates, etc., a clock (clock section) and a timer (time measuring section), and an output circuit for outputting a drive signal for the speaker 24 and a display signal for the image display unit 26. Output signals from the infrared camera 16, the yaw rate sensor 22, the vehicle speed sensor 18, and the brake sensor 20 are converted by the A/D converting circuit into digital signals, and the digital signals are input to the CPU 14c.

The CPU 14c of the image processing unit 14 reads the supplied digital signals, and executes the program while referring to the tables, the maps, and the templates, thereby functioning as various functioning means (also referred to as "functioning sections"), which will be described below, in order to send drive signals (a sound signal and a display signal) to the speaker 24 and the image display unit 26. Alternatively, the functioning means may be implemented by respective hardware components.

According to the present embodiment, the functioning sections of the image processing unit 14 include a head candidate extractor 101, a reference image generator 102, a target object determiner 103, a contact possibility determiner 106, and an attention seeking output generation determiner 108.

Essentially, the image processing unit 14 executes an object recognizing (object distinguishing) program (object detecting program) for recognizing (distinguishing) an object, by comparing an image captured by the infrared camera 16 with pattern templates stored in the storage unit 14m representing human body shapes, animal shapes, vehicle shapes, and artificial structure shapes such as columns or the like including utility poles.

As shown in FIG. 2, the infrared camera 16 is mounted on the front bumper of the vehicle 12 with the optical axis thereof extending parallel to the longitudinal axis of the vehicle 12. The infrared camera 16 has characteristics such that an output signal (captured image signal) from the infrared camera 16 is of a higher level (a higher luminance level) as the temperature of the target object imaged thereby becomes higher.

The HUD 26a is positioned to display a display screen thereof on the front windshield of the vehicle 12, at a position where the display screen will not obstruct the front view of the driver.

The image processing unit 14 converts a video signal, which is output from the infrared camera 16, into digital data at frame clock intervals/periods of several tens ms, e.g., 1 second/30 frames [ms], and stores the digital data in the storage unit 14m (image memory). The image processing unit 14 executes the functioning means discussed above, in order to perform various processing operations on an image of an area in front of the vehicle 12, which is represented by the digital data stored in the storage unit 14m.

The head candidate extractor 101 extracts an image portion of a target object to be monitored, such as a pedestrian, a vehicle (another vehicle), etc., from the image of the area in front of the vehicle 12, which is stored in the storage unit 14m, and based on the extracted image portion, extracts at least two head candidates that are present substantially horizontally in the extracted image portion.

The reference image generator 102 generates, as a reference image, a peripheral image of one of the at least two head candidates extracted by the head candidate extractor 101, and further generates an inverted image representing a horizontal inversion of the reference image.

The target object determiner 103 uses a peripheral image of the other of the at least two head candidates as a comparison image, and judges whether or not the at least two head candidates represent pedestrians based on the degree of coincidence between each of the reference image and the inverted image, which are generated from the one of the head candidates, with respect to the comparison image.

The attention seeking output generation determiner 108 calculates a rate of change Rate in the image portion of the target object to be monitored, between images that are captured at the above frame clock intervals/periods (prescribed time intervals). Then, using the rate of change Rate, the attention seeking output generation determiner 108 estimates a period of time T that the target object to be monitored takes to reach the vehicle 12, calculates the position of the target object to be monitored in actual space, and calculates a motion vector in actual space of the target object to be monitored.

The period of time TTC (Time To Contact) that the target object to be monitored takes to reach the vehicle 12, i.e., the period of time TTC that the target object to be monitored takes to come into contact with the vehicle 12, can be determined in a known fashion according to the following equation (1), from the rate of change Rate (determined from the image) and image capturing intervals (frame clock periods) dT (known), which serve as prescribed time intervals.

$$TTC = dT \times \text{Rate}/(1-\text{Rate}) \qquad (1)$$

The rate of change Rate is determined as a ratio between a width or length W0 (which may be stored as a number of pixels) of the target object to be monitored in an earlier-captured image and a width or length W1 (which may be stored as a number of pixels) of the target object to be monitored in a presently-captured image (Rate=W0/W1).

The distance Z up to the target object to be monitored is determined from the following equation (2), which is derived by multiplying both sides of the equation (1) by the vehicle speed Vs.

$$Z = \text{Rate} \times Vs \times dT/(1-\text{Rate}) \qquad (2)$$

The vehicle speed Vs is more precisely defined as the relative speed between the object to be monitored and the vehicle 12. When the object to be monitored is at rest, the relative speed is equal to the vehicle speed Vs.

The attention seeking output generation determiner 108 calculates a change in position Δx (horizontal) and a change in position Δy (vertical) of the image portion of the target object to be monitored between images that are captured at prescribed time intervals, and determines the possibility that the target object to be monitored and the vehicle 12 will come into contact with each other, based on the determined period of time TTC and the calculated changes in position (motion vectors) Δx, Δy.

The vehicle periphery monitoring apparatus 10 is constructed basically as described above. An operation sequence of the vehicle periphery monitoring apparatus 10 will be described in detail below with reference to the flowchart shown in FIG. 3.

Figure 3:
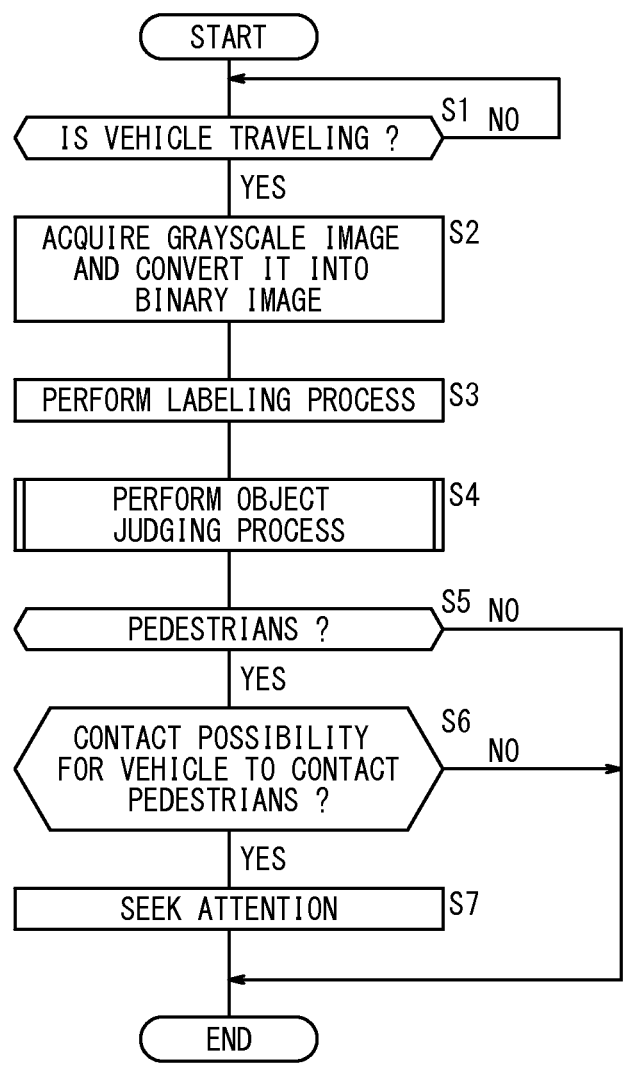
FIG. 3 is a flowchart of an operation sequence of an image processing unit of the vehicle periphery monitoring apparatus.

In step S1 of FIG. 3, based on the vehicle speed Vs detected by the vehicle speed sensor 18, the image processing unit 14 judges whether the vehicle 12 is traveling or is at rest. If the vehicle 12 is at rest (step S1: NO), the operation sequence is stopped.

If the vehicle 12 is traveling (step S1: YES), then in step S2, the image processing unit 14 acquires an infrared image of an area within a given angle of view in front of the vehicle 12, which is represented by an output signal from the infrared camera 16 in each frame, converts the infrared image into a digital grayscale image, stores the digital grayscale image in the image memory (storage unit 14*m*), and binarizes the stored grayscale image.

More specifically, the image processing unit 14 performs a binarizing process on the grayscale image in order to detect (extract) a pedestrian head candidate, a pedestrian torso candidate including arms, and pedestrian leg candidates. A substantially horizontal line interconnecting the low ends of the pedestrian leg candidates may be regarded as a point of contact with the road surface. By performing a binarizing process based on different threshold values, it is possible to perform a ternarizing process on the grayscale image in order to detect the pedestrian head candidate, a human body part such as a torso candidate other than the pedestrian head candidate, and a background (ambient temperature).

Since the head of a human has a high surface temperature and a round shape, it is easy to extract the head candidate from the binary image of the grayscale image, which is captured by the infrared camera 16.

In the present embodiment, the image processing unit 14 performs a ternarizing process on the grayscale image, for example, by performing a binarizing process, so as to convert a high brightness area R2 (hereinafter referred to as an "area R2"), which is brighter than a first brightness threshold value Th1, into "2", and to convert an area R1, which is darker than the first brightness threshold value Th1 and brighter than a second brightness threshold value Th2 (Th2<Th1), into "1", and thereafter, by performing another binarizing process, so as to convert an area R0, which is darker than the second brightness threshold value Th2, into "0". The image processing unit 14 stores the ternarized image in each frame in the storage unit 14*m*.

Figure 4:
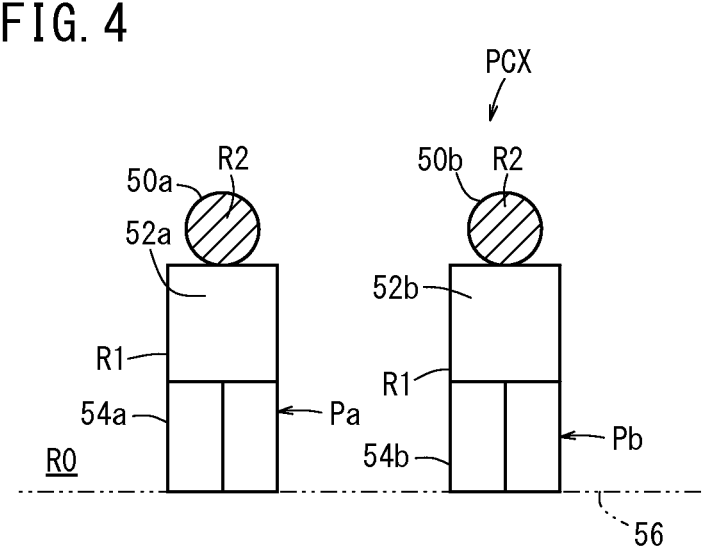
FIG. 4 is a diagram showing a binary image that represents pedestrians positioned side by side.

FIG. 4 shows an image that is stored in the storage unit 14*m*. When an image of pedestrians Pa, Pb (human bodies, humans) positioned side by side is converted according to the ternarizing process based on the binarizing processes, heads 50*a*, 50*b*, which are of the highest brightness, are converted into the areas R2 shown in hatching, torsos 52*a*, 52*b* and legs 54*a*, 54*b*, which are of the next highest brightness, are converted into the areas R1 shown in outline, and a background, that is lowest in brightness and represents the ambient temperature, is converted into the area R0. Points of contact between the pedestrians Pa, Pb and road surface 56 can be detected from the lower ends of the legs 54*a*, 54*b*. The present invention may also be applied to a situation in which the points of contact between the pedestrians Pa, Pb and the road surface 56 are vertically displaced from each other.

Before the pedestrians Pa, Pb, the heads 50*a*, 50*b*, the torsos 52*a*, 52*b*, and the legs 54*a*, 54*b* are judged (identified) in step S4, as will be described below, the pedestrians Pa, Pb, the heads 50*a*, 50*b*, the torsos 52*a*, 52*b*, and the legs 54*a*, 54*b* are referred to as "pedestrian candidates Pa, Pb", "head candidates 50*a*, 50*b*", "torso candidates 52*a*, 52*b*", and "leg candidates 54*a*, 54*b*", respectively.

In step S3, the head candidates 50*a*, 50*b* of the detected pedestrian candidates Pa, Pb have heights from the road surface 56 that lie within a prescribed height range, and the head candidates 50*a*, 50*b* are spaced from each other by a distance that lies within a prescribed distance range. Thus, the pedestrian candidates Pa, Pb are estimated as a side-by-side pedestrian candidate PCX, and are labeled as run-length data and stored, i.e., a labeling process is performed on the image. At this time, the processed and stored image is a large quadrangle-shaped image including a quadrangle circumscribing the pedestrian candidate PCX, which is made up of the pedestrian candidate Pa and the pedestrian candidate Pb. If necessary, a number of large quadrangle-shaped images including quadrangles circumscribing pedestrian candidates PCX therein are converted into images of one size in respective frames, to thereby facilitate image processing.

Figure 5:
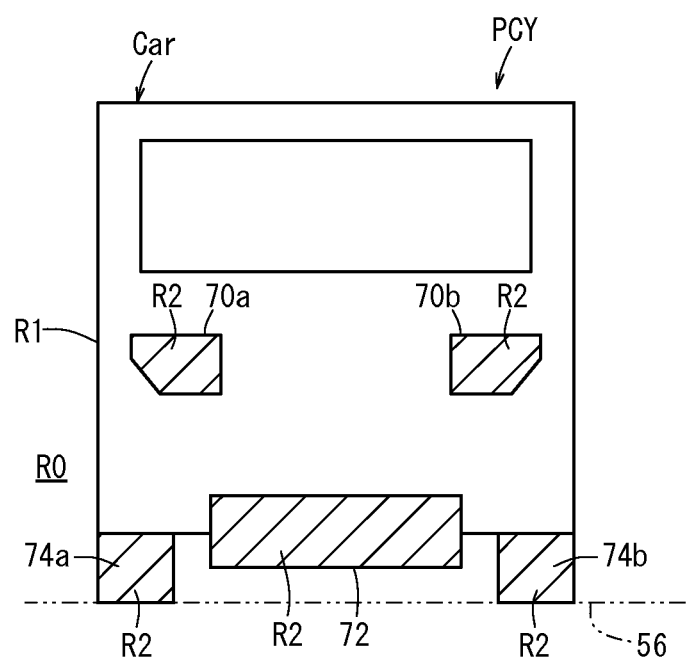
FIG. 5 is a diagram showing a binary image that represents a vehicle.

In the binarizing process, which is performed in step S2, an image of another vehicle Car, as shown in FIG. 5, is processed in the following manner. Lights 70*a*, 70*b* on laterally spaced left and right end portions of the other vehicle Car, such as headlights (oncoming car) or taillights (preceding car), a front grill (oncoming car) or an exhaust pipe (preceding car) on a lower central portion 72 of the other vehicle Car, and left and right tires 74*a*, 74*b* of the other vehicle Car are converted into high brightness areas R2, which are shown in hatching due to their higher brightness level.

If the ambient temperature is lower than the vehicle body of the other vehicle Car, other vehicle body portions of the other vehicle Car are converted into an area R1, as shown in outline, and the background is converted into an area R0.

The road surface 56 can be detected based on points of contact between the tires 74a, 74b with the road surface 56.

When the horizontally spaced lights 70a, 70b, which are of a higher brightness level, are detected in the binarizing process, a quadrangular mask having a prescribed area and extending horizontally above the lights 70a, 70b is applied to the image of the other vehicle Car and is moved vertically. In addition, an area having a succession of identical pixel values within the grayscale image in the mask is detected as a roof (and a roof edge). Further, from the grayscale image, in a vertically-extending quadrangular mask, an area having a succession of identical pixel values laterally of the lights 70a, 70b is detected (extracted) as a pillar (and a pillar edge) or a fender (and a fender edge).

The height of the detected lights 70a, 70b from the road surface 56 falls within a prescribed height range at which the lights 70a, 70b may possibly be detected in error as the heads 50a, 50b. Also, the distance between the lights 70a, 70b falls within the prescribed distance range. Therefore, the lights 70a, 70b are regarded as head candidates (i.e., before lights 70a, 70b are judged as being lights in step S4, the lights 70a, 70b are also referred to as head candidates 70a, 70b), and the lights 70a, 70b are estimated as being a side-by-side pedestrian candidate PCY, labeled as run-length data, and stored.

In other words, in step S3, the labeling process is carried out. At this time, the image, which has been processed and stored, is a large quadrangle-shaped image including a quadrangle circumscribing a pedestrian candidate PCY. A number of large quadrangle-shaped images including quadrangles circumscribing pedestrian candidates PCY therein are converted into images of one size in respective frames to thereby facilitate image processing.

Consequently, in steps S2 and S3, the head candidate extractor 101 detects the side-by-side pedestrian candidate PCX (FIG. 4) including the head candidates 50a, 50b, or the side-by-side pedestrian candidate PCY (FIG. 5) including the head candidates 70a, 70b.

In step S4, an object judging process is carried out on the pedestrian candidate PCX and the pedestrian candidate PCY. More specifically, a judgment is made as to whether the pedestrian candidate PCX and the pedestrian candidate PCY represent pedestrians Pa, Pb actually walking side by side, or a vehicle Car having lights 70a, 70b.

Figure 6:
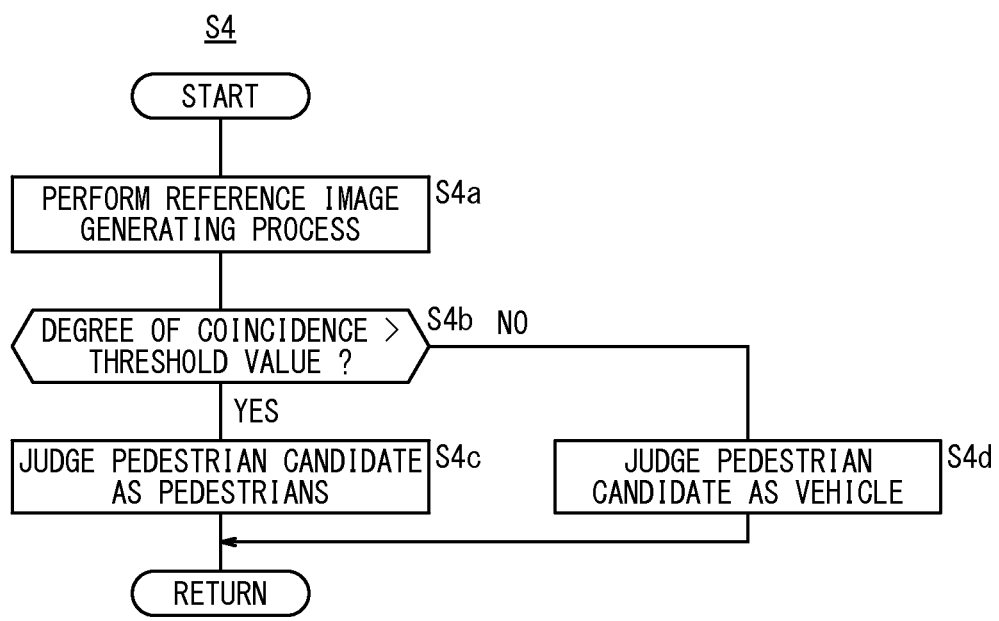
FIG. 6 is a flowchart of a detailed operation sequence of an object judging process in the operation sequence shown in FIG. 3.

FIG. 6 is a detailed flowchart of the object judging process carried out in step S4.

In step S4a of FIG. 6, the reference image generator 102 performs a reference image generating process.

Figure 7:
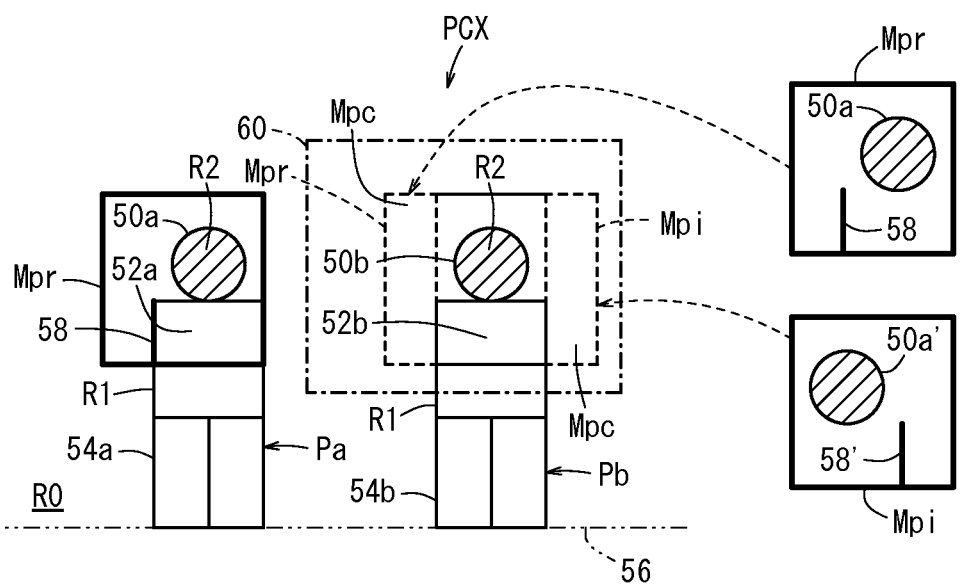
FIG. 7 is a diagram illustrating a manner of calculating a degree of coincidence of a pedestrian with respect to another pedestrian.

As shown in FIG. 7, in the reference image generating process, the reference image generator 102 generates (captures), as a reference image (reference mask) Mpr, a peripheral image in a prescribed range which includes the head candidate 50a of one of the pedestrian candidates Pa, Pb that make up the pedestrian candidate PCX, i.e., the left pedestrian candidate Pa according to the present embodiment, and a vertical edge 58 of the torso candidate 52a as another feature portion. The reference image generator 102 also generates an inverted image (inverted mask) Mpi having a head candidate 50a' and an edge 58', which is a reference image representing a horizontal inversion of the reference image Mpr.

The reference image Mpr may be generated as a binary image having a high brightness area "1" representing the pedestrian candidates Pa (50a, 52a, 54a), Pb (50b, 52b, 54b) extracted as a whole, and an area "0" representing the background.

In step S4b, the target object determiner 103 performs an identifying process (determining process, degree-of-coincidence (degree-of-similarity) calculating process) for judging whether the pedestrian candidate PCX is representative of two pedestrians positioned side by side or a vehicle.

In step S4b, as shown in FIG. 7, a peripheral image including the head candidate 50b of the other pedestrian candidate Pb is used as a comparison image Mpc. The comparison image Mpc is of the same size as the reference image Mpr and the inverted image Mpi.

The target object determiner 103 establishes a searching range (scanning range) 60, which includes the head candidate 50b of the other pedestrian candidate Pb and has an area wider than the area of the reference image MPr, compares the reference image Mpr and the inverted image Mpi with the comparison image Mpc in successive pixels scanned within the searching range 60 from an upper left corner toward a lower left corner pixel by pixel, for example, calculates a degree of coincidence between the comparison image Mpc and the reference image Mpr in each of the compared positions, and calculates a degree of coincidence between the comparison image Mpc and the inverted image Mpi in each of the compared positions. In each of the scanned positions, the degree of coincidence is calculated as the total of the squares of the differences between the pixel values of corresponding pixels of the comparison image Mpc and the reference image Mpr (grayscale images, binary images, or tertiary images), and the total of the squares of the differences between the pixel values of corresponding pixels of the comparison image Mpc and the inverted image Mpi (grayscale images, binary images, or tertiary images), or as reciprocals of the above totals.

With respect to the pedestrian candidate PCX shown in FIG. 7, the head candidates 50a, 50b of the pedestrian candidate Pa and the pedestrian candidate Pb are highly similar in shape, and therefore, the pedestrian candidates Pa, Pb are of a symmetrical shape with respect to vertical lines that divide the head candidates 50a, 50b into left and right parts. Consequently, there are positions, i.e., compared positions or scanned positions, where both the degree of coincidence between the reference image Mpr generated from the left pedestrian candidate Pa and the comparison image Mpc generated from the right pedestrian candidate Pb, and the degree of coincidence between the inverted image Mpi generated from the left pedestrian candidate Pa and the comparison image Mpc generated from the right pedestrian candidate Pb are very high.

Since in step S4b there are compared positions in which the degree of coincidence (degree of similarity) within the searching range 60 between the reference image Mpr and the comparison image Mpc, and between the inverted image Mpi and the comparison image Mpc is higher (greater) than a threshold value (step S4b: YES), in step S4c, the target object determiner 103 judges that the pedestrian candidate PCX represents pedestrians Pa, Pb positioned side by side.

In step S4a, substantially at the same time that the reference image generator 102 performs the reference image generating process on the pedestrian candidate PCX, the reference image generator 102 also performs a reference image generating process on the pedestrian candidate PCY, which actually represents a vehicle Car.

Figure 8:
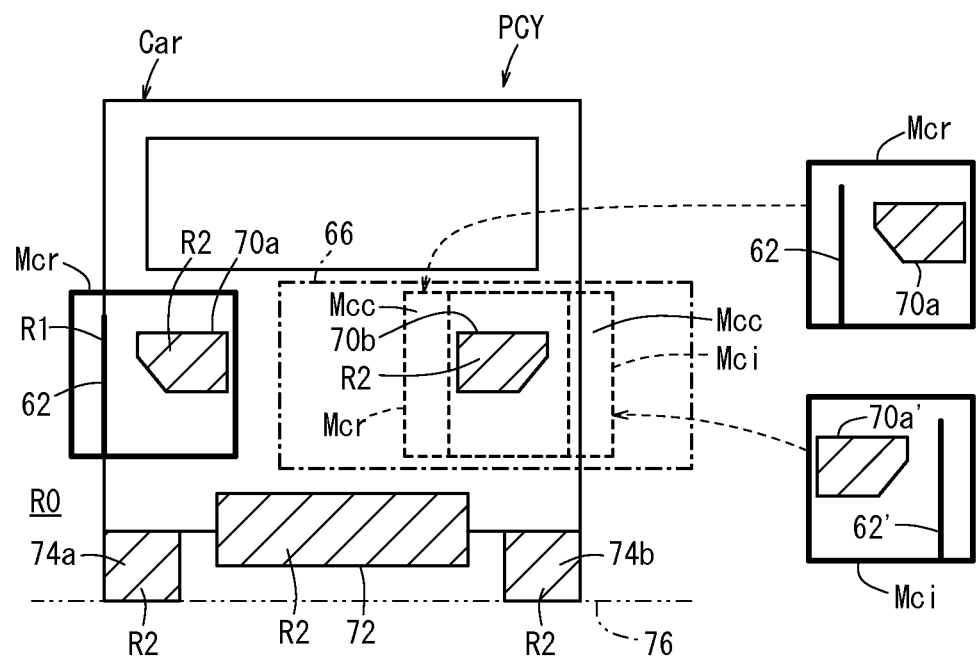
FIG. 8 is a diagram illustrating a manner of calculating a degree of coincidence of a light on a vehicle with respect to another light on the vehicle.

As shown in FIG. 8, in the reference image generating process, the reference image generator 102 generates (captures), as a reference image (reference mask) Mcr, a peripheral image within a prescribed range, which includes the head candidate 70a of one of the head candidates 70a, 70b that make up the pedestrian candidate PCY, i.e., the left head candidate 70a according to the present embodiment, and a vertical edge 62 of the rear fender (left rear fender) of the vehicle Car as another feature portion. The reference image generator 102 also generates an inverted image (inverted mask) Mci having a head candidate 70a' and an edge 62', which is a reference image representing a horizontal inversion of the reference image Mcr.

The reference image Mcr may be generated as a binary image from the pedestrian candidate PCY by extracting, from the grayscale image, a vertically extending long straight portion, which corresponds to a fender, within a prescribed horizontal range on right or left sides of the detected head candidates 70a, 70b.

In step S4b, the target object determiner 103 performs an identifying process (determining process, degree-of-coincidence (degree-of-similarity) calculating process) for judging whether the pedestrian candidate PCY is representative of two pedestrians positioned side by side or a vehicle. The identifying process is performed in the same way that the target object determiner 103 performs the identifying process on the pedestrian candidate PCX.

In step S4b, as shown in FIG. 8, a peripheral image including the other head candidate 70b is used as a comparison image Mcc. The comparison image Mcc is of the same size as the reference image Mcr and the inverted image Mci.

The target object determiner 103 establishes a searching range (scanning range) 70, which includes the other head candidate 70b and has an area wider than the area of the reference image Mcr, compares the reference image Mcr and the inverted image Mci with the comparison image Mcc in successive pixels scanned within the searching range 66 from an upper left corner toward a lower left corner pixel by pixel, for example, calculates a degree of coincidence between the comparison image Mcc and the reference image Mcr in each of the compared positions, and calculates a degree of coincidence between the comparison image Mcc and the inverted image Mci in each of the compared positions. As described above, in each of the scanned positions, the degree of coincidence is calculated as the total of the squares of the differences between the pixel values of corresponding pixels of the comparison image Mcc and the reference image Mcr (grayscale images, binary images, or tertiary images), and the total of the squares of the differences between the pixel values of corresponding pixels of the comparison image Mcc and the inverted image Mci (grayscale images, binary images, or tertiary images), or as reciprocals of the aforementioned totals.

With respect to the pedestrian candidate PCY shown in FIG. 8, the head candidate 70a and the head candidate 70b are not similar in shape, and therefore, the relationship between the head candidate 70a and the edge 62 in the reference image Mcr is not satisfied in the comparison image Mcc. Although there are positions (compared positions or scanned positions) in which the degree of coincidence between the inverted image Mci and the comparison image Mcc is very high within the searching range 66, the degree of coincidence between the reference image Mcr and the comparison image Mcc is not so high with respect to positions within the searching range 66.

Since the compared positions judged in step S4b, in which the degree of coincidence (degree of similarity) within the searching range 66 is higher (greater) than a threshold value, exist for only one of the compared positions between the reference image Mcr and the comparison image Mcc or the compared positions between the inverted image Mci and the comparison image Mcc (step S4b: NO), in step S4d, the target object determiner 103 can judge that the pedestrian candidate PCY represents a vehicle Car.

After the object judging process has been carried out in step S4, which is made up of steps S4a through S4d, the pedestrian candidate PCY is judged in step S5 of FIG. 3 as being a vehicle Car based on the results of steps S4c and S4d, and is excluded from target objects to be processed subsequently (step S5: NO).

In step S6, the contact possibility determiner 106 determines a possibility that the pedestrians Pa, Pb, which are detected from the pedestrian candidate PCX in step S4 and have been judged in step S5 (step S5: YES), will come into contact with the vehicle (the driver's own vehicle) 12.

More specifically, the contact possibility determiner 106 determines a possibility that the vehicle 12 will come into contact with the pedestrians Pa, Pb, in view of the period of time TTC according to equation (1) and respective motion vectors of the pedestrians Pa, Pb (possibly also the distance Z), and also based on the brake depressed angle Br, the vehicle speed Vs, and the yaw rate Yr, which are represented by output signals from the brake sensor 20, the vehicle speed sensor 18, and the yaw rate sensor 22. If the contact possibility determiner 106 decides that the vehicle 12 has a possibility of coming into contact with the pedestrians Pa, Pb (S6: YES), then in step S7, the attention seeking output generation determiner 108 generates an attention seeking output signal in order to seek the attention of the driver, e.g., to provide the driver with information. More specifically, the attention seeking output generation determiner 108 highlights the pedestrians in the grayscale image on the HUD 26a with a surrounding color frame in a bright color, and produces a warning sound from the speaker 24, thereby seeking the attention of the driver of the vehicle 12.

More specifically, the attention seeking output generation determiner 108 highlights the pedestrians Pa, Pb in the grayscale image on the HUD 26a along with a surrounding color frame in a bright color such as red or yellow.

Overview of the Embodiment and Modifications

As described above, using the grayscale image acquired by a single infrared camera 16 mounted on the vehicle 12, the vehicle periphery monitoring apparatus 10 monitors the occurrence of pedestrians Pa, Pb in the periphery of the vehicle 12.

The head candidate extractor 101 extracts at least two head candidates 50a, 50b and two head candidates 70a, 70b that are present substantially horizontally from the grayscale image.

Thereafter, the reference image generator 102 generates a peripheral image of one 50a of the at least two head candidates 50a, 50b, which are represented by the pedestrian candidate PCX, as a reference image Mpr, and generates an inverted image Mpi, which is a horizontal inversion of the reference image Mpr. The reference image generator 102 also generates a peripheral image of one 70a of the at least two head candidates 70a, 70b, which are represented by the pedestrian candidate PCY, as a reference image Mcr, and generates an inverted image Mci, which is a horizontal inversion of the reference image Mcr.

The target object determiner 103 uses a peripheral image of the other head candidate 50b as a comparison image Mpc, and judges whether the at least two head candidates 50a, 50b represent pedestrians Pa, Pb or a vehicle Car, based on the degree of coincidence between the reference image Mpr and the comparison image Mpc, and the degree of coincidence between the inverted image Mpi and the comparison image Mpc.

The target object determiner 103 also uses a peripheral image of the other head candidate 70*b* as a comparison image Mcc, and judges whether the at least two head candidates 70*a*, 70*b* represent pedestrians Pa, Pb or a vehicle Car, based on the degree of coincidence between the reference image Mcr and the comparison image Mcc, and the degree of coincidence between the inverted image Mci and the comparison image Mcc.

If the degree of coincidence between the comparison image Mpc concerning the other head candidate 50*b* and the reference image Mpr concerning the one head candidate 50*a*, and the degree of coincidence between the comparison image Mpc concerning the other head candidate 50*b* and the inverted image Mpi concerning the one head candidate 50*a* are higher than the threshold value, then the head candidates 50*a*, 50*b* are judged as representing pedestrians Pa, Pb. If the aforementioned degrees of coincidence are lower than the threshold value, then the head candidates 50*a*, 50*b* are judged as representing a vehicle Car. Thus, the pedestrians Pa, Pb and the vehicle Car can be distinguished accurately from each other.

Similarly, if the degree of coincidence between the comparison image Mcc concerning the other head candidate 70*b* and the reference image Mcr concerning the one head candidate 70*a*, and the degree of coincidence between the comparison image Mcc concerning the other head candidate 70*b* and the inverted image Mci concerning the one head candidate 70*a* are higher than the threshold value, the head candidates 70*a*, 70*b* are judged as representing pedestrians Pa, Pb. If the above degrees of coincidence are lower than the threshold value, the head candidates 70*a*, 70*b* are judged as representing a vehicle Car. In this manner, the pedestrians Pa, Pb and the vehicle Car can be distinguished accurately from each other.

Consequently, the frequency at which a vehicle Car is detected mistakenly as representing pedestrians Pa, Pb positioned side by side can be lowered.

In the above embodiment, the reference image generator 102 generates, as a reference image Mpr (Mcr), a peripheral image of one 50*a* (70*a*) of the at least two head candidates 50*a*, 50*b* (70*a*, 70*b*) represented by the pedestrian candidate PCX (PCY), and generates an inverted image Mpi (Mci), which is a horizontal inversion of the reference image Mpr (Mcr). However, according to a modification, the reference image generator 102 may generate only a peripheral image including the one head candidate 50*a* (70*a*) as a reference image Mpr (Mcr). In this case, the target object determiner 103 may use a peripheral image including the other head candidate 50*b* (70*b*) as a comparison image Mpc (Mcc), and judge whether the at least two pedestrian candidates PCX (PCY) represent pedestrians Pa, Pb or a vehicle Car, based on the degree of symmetry between the comparison image Mpc (Mcc) and the reference image Mpr (Mcr).

Even though an inverted image Mpi (Mci) of the reference image Mpr (Mcr) is not generated, since the heads are of round, nearly horizontally symmetrical shapes, and there are certain lights that are of rectangular horizontally asymmetrical shapes, by comparing the above shapes, the target object determiner 103 is capable of judging whether the at least two pedestrian candidates PCX (PCY) represent pedestrians Pa, Pb or a vehicle Car, based solely on the degree of symmetry, i.e., some head candidates that are horizontally symmetrically shaped and other head candidates that are horizontally asymmetrically shaped.

According to another modification, instead of a peripheral image including the one head candidate 50*a* (70*a*), the reference image generator 102 may generate an image of only the one head candidate 50*a* (70*a*) as the reference image Mpr (Mcr). Further, instead of a peripheral image including the other head candidate 50*b* (70*b*), the target object determiner 103 may use an image of only the other head candidate 50*b* (70*b*) as the comparison image Mpc (Mcc). In this case, the reference image generator 102 judges whether the pedestrian candidate PCX (PCY) represents pedestrians Pa, Pb or a vehicle based on the degree of symmetry of the image of only the other head candidate 50*b* (70*b*) and the image of only the one head candidate 50*a* (70*a*). In this manner, the pedestrians Pa, Pb and the vehicle Car can be distinguished from each other to a certain extent.

In FIG. 7, for example, the image of only the head candidate 50*a* implies an image of the head 50*a* itself, or an image of a quadrangle circumscribing the head 50*a* (because the area of the head 50*a* is represented by "1" whereas the area other than the head 50*a* is represented by "0", the image of the circumscribing quadrangle eventually represents only the head 50*a*). In FIG. 8, the image of only the head candidate 70*a* implies an image of the light 70*a* itself, or an image of a quadrangle circumscribing the light 70*a* (because the area of the light 70*a* is represented by "1" whereas the area other than the light 70*a* is represented by "0", the image of the circumscribing quadrangle eventually represents only the light 70*a*).

Then, the reference image generator 102 is capable of distinguishing the pedestrians Pa, Pb and the vehicle Car accurately from each other, by including the head candidate 50*a* (70*a*) and the edge (profile) 58 (62) as another feature in the reference image Mpr (Mcr) as the peripheral image. If the edge 58 (62) comprises a substantially vertical edge offset to either the left or the right from the head candidate 50*a* (70*a*), then a vertical edge of the torso 52*a* of the pedestrian Pa, or a fender edge or a pillar edge of the vehicle Car can be selected.

The present invention is not limited to the above embodiment, but may employ various other arrangements based on the contents of the present description.

Figure 9:
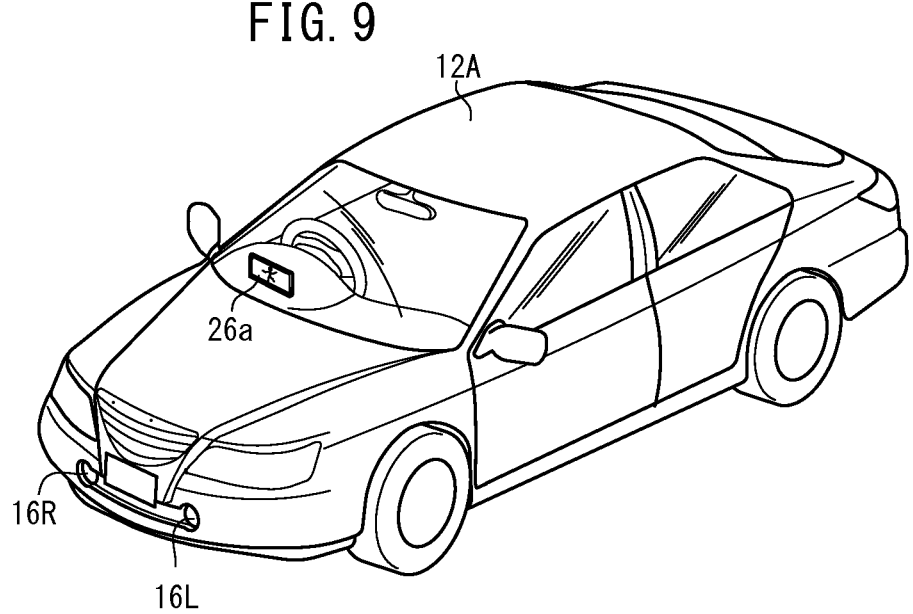
FIG. 9 is a perspective view of a vehicle in which a vehicle periphery monitoring apparatus according to another embodiment of the present invention is incorporated.

For example, as shown in FIG. 9, a vehicle periphery monitoring apparatus, which is incorporated in a vehicle 12A, may include a pair of left and right infrared cameras 16L, 16R that are mounted on the vehicle 12A. The infrared cameras 16L, 16R, which are combined into a stereo camera system, are mounted on a front bumper of the vehicle 12A at respective positions, which are symmetric with respect to a transverse central axis of the vehicle 12. The infrared cameras 16L, 16R have respective optical axes arranged parallel to each other and which are located at equal heights from the road surface. The vehicle periphery monitoring apparatus, which includes the left and right infrared cameras 16L, 16R, handles a high-temperature area as a target object in left and right images of the periphery of the vehicle 12A that are captured by the infrared cameras 16L, 16R, calculates the distance up to the target object according to trigonometric principles based on a parallax of the target object in the left and right images, detects an object that is likely to affect travel of the vehicle (the driver's own vehicle) 12A from the moving direction (motion vector) and the position of the target object, and outputs an attention seeking output signal to seek the attention of the driver of the vehicle 12A.

The invention claimed is:

1. A vehicle periphery monitoring apparatus for monitoring pedestrians in periphery of a vehicle based on an image captured by an infrared camera that is mounted on the vehicle, comprising:
   a head candidate extractor for extracting at least two head candidates, which are spaced apart from each other in a substantially horizontal direction, from the image;
   a reference image generator for generating a peripheral image including one of the extracted at least two head candidates as a reference image; and
   a target object determiner, which uses a peripheral image including another of the head candidates as a comparison image, determining a degree of horizontal symmetry between the comparison image including the another of the at least two head candidates and the reference image including the one of the at least two head candidates and judging whether the at least two head candidates represent pedestrians or a vehicle based on the degree of horizontal symmetry between the comparison image and the reference image, and
   wherein the reference image generator generates the reference image in such a manner that another feature is included in the peripheral image in addition to the one of the extracted at least two head candidates.

2. The vehicle periphery monitoring apparatus according to claim 1, wherein the reference image generator generates an image of only the one head candidate as the peripheral image including the one head candidate for use as the reference image; and
   the target object determiner uses an image of only the other head candidate as the peripheral image including the other head candidate for use as the comparison image, and judges whether the at least two head candidates represent pedestrians or a vehicle based on the degree of symmetry between the image of only the other head candidate and the image of only the one head candidate.

3. The vehicle periphery monitoring apparatus according to claim 1, wherein the reference image generator generates the peripheral image including the one of the extracted at least two head candidates as the reference image, and generates an inverted image, which is a horizontal inversion of the reference image; and
   the target object determiner uses the peripheral image including the other head candidate as the comparison image, and judges whether the at least two head candidates represent pedestrians or a vehicle based on a degree of coincidence between the reference image and the comparison image, and a degree of coincidence between the inverted image and the comparison image.

4. The vehicle periphery monitoring apparatus according to claim 1, wherein the other feature comprises a substantially vertically extending edge, which is offset from the head candidates to the left or right of the head candidates.

5. The vehicle periphery monitoring apparatus according to claim 1, wherein the target object determiner judges whether the at least two head candidates represent pedestrians or lights mounted in left and right positions on the vehicle.

6. A vehicle periphery monitoring method of monitoring pedestrians in periphery of a vehicle based on an image captured by an infrared camera that is mounted on the vehicle, comprising steps of:
   (i) extracting, by using a computer, at least two head candidates, which are spaced apart from each other in a substantially horizontal direction, from the image;
   (ii) generating, by using a computer, a peripheral image including one of the extracted at least two head candidates as a reference image; and
   (iii) determining, by using a computer, by using a peripheral image including another of the head candidates as a comparison image, a degree of horizontal symmetry between the comparison image including the another of the at least two head candidates and the reference image including the one of the at least two head candidates and judging whether the at least two head candidates represent pedestrians or a vehicle based on the degree of horizontal symmetry between the comparison image and the reference image, and
   wherein the step (ii) generates the reference image in such a manner that another feature is included in the peripheral image in addition to the one of the extracted at least two head candidates.

* * * * *